United States Patent [19]
Eskeli

[11] 3,895,491
[45] July 22, 1975

[54] TURBINE WITH DUAL ROTORS
[76] Inventor: Michael Eskeli, 7994-41 Locke Lee, Houston, Tex. 77042
[22] Filed: Oct. 11, 1973
[21] Appl. No.: 405,628

[52] U.S. Cl. .................... 60/650; 415/1; 415/178; 60/682
[51] Int. Cl. ...... F01k 25/02; F02c 1/04; F02g 1/00
[58] Field of Search .......... 415/1, 178; 60/327, 325, 60/329, 650, 682, 655; 62/401

[56] References Cited
UNITED STATES PATENTS
2,334,625   11/1943   Heppner .................. 415/147 X
3,761,195   9/1973    Eskeli ..................... 415/1

Primary Examiner—Martin P. Schwadron
Assistant Examiner—H. Burks, Sr.
Attorney, Agent, or Firm—Clegg, Cantrell & Crisman

[57] ABSTRACT

A method and apparatus for generating power by passing a fluid from a higher energy level to a lower energy level by compressing said fluid first in a continuous flow centrifuge rotor and then reducing the pressure of said fluid in an inward flow reaction turbine. The fluid enters the first rotor at center and leaves the second rotor at center, and vanes are provided within both rotors to assure that said fluid will rotate with said rotors. Nozzles are provided near the periphery of the first rotor to increase the absolute tangential velocity of the fluid leaving said first rotor; the tangential velocity of second rotor is greater than said first rotor tangential velocity. Fluids that may be used are either liquids or gases, including steam. Heat may be added to said fluid during its passage through either compression or during expansion for increased power output.

8 Claims, 3 Drawing Figures

PATENTED JUL 22 1975　　　　　　　　　　　　　　3,895,491

TURBINE WITH DUAL ROTORS

CROSS REFERENCES TO RELATED APPLICATIONS

The principles used with the turbine of this application were used also with "Rotary Heat Exchanger with Dual Rotors," filed 1/20/72, Ser. No. 219,212, now Pat. No. 3,791,167.

BACKGROUND OF THE INVENTION

This invention relates generally to devices for generating power in response of a fluid being flowed from a higher energy level to a lower energy level by passing said fluid through a turbine for generating said power.

There have been various types of turbines previously, in some of which a fluid is accelerated in a single or multiple stationary nozzles and then passed to vanes mounted on a rotating rotor wheel, where the kinetic energy of the moving fluid is converted to power.

These conventional turbines normally have high energy losses due to fluid friction, especially between rotor vanes and the fluid where the velocity differentials are usually large. Also, these turbines often require complex shaped turbine vanes making the unit costly.

DESCRIPTION OF PREFERRED EMBODIMENTS

It is an object of this invention to provide a turbine for generating power which is simple in construction and low in cost, and which has a high efficiency of operation with low fluid velocities relative to the turbine rotor. Further, it is an object of this invention to provide a turbine wherein the turbine rotors may be encased within an evacuated casing to reduce fluid friction on the rotor; also, it is an object of this invention to provide a turbine where heat may be added to the fluid flowing within said turbine by circulating a heating fluid with heat exchange relationship with said working fluid, for increased power output.

Figure 1:
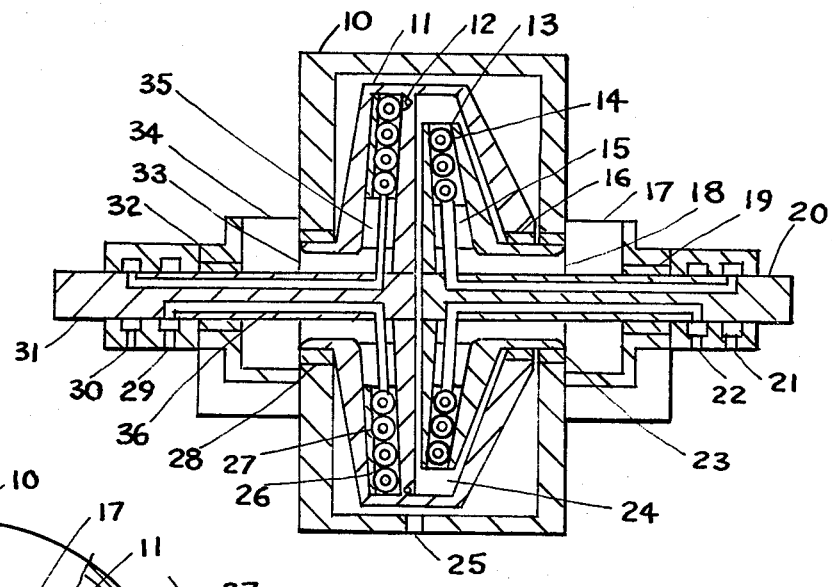
FIG. 1 is a cross section of the turbine.

Referring to FIG. 1, therein is shown a cross section of the turbine. 10 is casing, 11 is first rotor, 12 is nozzle within said first rotor, 13 is second rotor, 14 is second rotor heat exchanger, 15 is vane within second rotor working fluid passage, 16 is rotor seal, 17 is working fluid outlet from unit, 18 is exit port for working fluid from second rotor, 19 is bearing supporting second rotor shaft 20, 21 and 22 are heating fluid inlet and exit for second rotor, 23 is rotor seal, 24 is space within said first rotor, 25 is vent aperture to casing space, 26 is support plate for first rotor heat exchanger 27, 28 is a seal, 36 is heating fluid passage within first rotor shaft 31, 29 and 30 are heating fluid entry and exit to first rotor, 32 is bearing supporting first rotor shaft 31, 33 is working fluid entry port to first rotor 11, 34 is working fluid entry to unit, 35 is vane within first rotor working fluid radial passageway.

Figure 2:
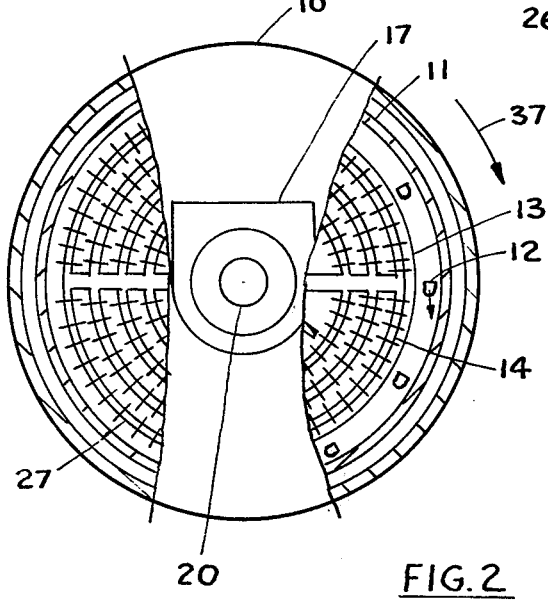
FIG. 2 is an end view of the same unit as FIG. 1, with portions removed to show interior details.

In FIG. 2, an end view of the unit is shown, with portions removed to illustrate turbine interior. 10 is casing, 11 is first rotor, 12 are first rotor nozzles, 13 is second rotor, 17 is working fluid exit, 37 indicates direction of rotation for both rotors, 14 is second rotor heat exchanger, 20 is second rotor shaft, 27 is first rotor heat exchanger.

Figure 3:
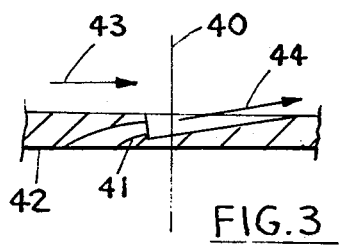
FIG. 3 is a detail of the first rotor nozzles.

In FIG. 3, a detail is shown illustrating first rotor nozzles. 40 is direction of shaft about which said rotor rotates, 43 is direction of rotor rotation, 41 is nozzle mounted in wall 42, and 44 indicates direction of fluid leaving said nozzle 41.

In operation, working fluid enters said first rotor 11 via entry port 33, and passes to interior radially extending working fluid passageways where vanes 35 and heat exchanger 27 will assure that said fluid will rotate with said first rotor. Said working fluid is compressed by centrifugal action on said fluid by said rotor with a pressure increase, and after compression, said working fluid is discharged through nozzles 12 in forward direction, so that the absolute tangential working fluid velocity leaving said nozzles is greater than the tangential velocity of said nozzles. Said working fluid then passes to radially inward extending passageways of said second rotor where said working fluid is decelerated with work associated with such deceleration being passed to second rotor vanes 15, and also through heat exchanger 14, to said second rotor and thence to second rotor shaft 20. After deceleration and expansion within said second rotor, said working fluid leaves via exit port 18.

Heat may be added to said working fluid during said passage and compression within said first rotor, and also during deceleration and expansion within said second rotor. Such heat addition during said compression will increase the enthalpy of the working fluid, allowing increased rotor speed for said second rotor and thus increased power output for said turbine. Heat addition during said expansion will reduce the working fluid density and and allow greater second rotor speed and thus produce more power. One or both of these heat exchangers may be used with the turbine of this invention; also, the turbine may be used without heat addition in either rotor. If the heat exchanger 27 is deleted, vanes 35 will be extented to the first rotor periphery thus assuring that said working fluid will rotate with said first rotor. If the second rotor heat exchanger 14 is deleted, then vanes 15 will be extented to the rotor tip to assure that said working fluid will rotate with said second rotor. The heating fluid is supplied to both rotors via passages through rotor shafts, and then distributed to said heat exchangers where said working fluid will pass in heat exchange relationship with said heating fluid. Said heating fluid may be a liquid, or it may be a gas, as desired. The heating fluid entering temperature may be sufficiently high to transfer heat to said working fluid within said rotors; this is normally done when said heating fluid is a liquid. Said heating fluid may also gain in temperature within said rotor due to high rotor tangential speeds which will cause the heating fluid pressure and temperature to raise; this is normal when said heating fluid is a gas at heat exchanger entry.

The rotors shown in the drawings are shaped to allow high rotational speeds. The rotor walls are made of heavy material sections to withstand stresses, and are usually thicker near the shaft. The heat exchangers are shown made of finned tubing, attached to support plates to prevent crushing, and said support plates are then supported by said rotor walls. Other types heat exchanger arrangements may be used, such as building the heating fluid passages to said rotor walls.

The radial working fluid velocity within the radially extending rotor passages within both rotors, are generally low, so that the compression within said first rotor is nearly non-flow type.

The turbine of this invention may be also made as a multistage unit, with the working fluid passing from one stage to next, with a reduction in energy level in each stage for said working fluid.

Various controls, governors and gauges are used with the device of this invention. They do not form a part of this invention and are not further described herein.

The absolute tangential velocity of the said working fluid entering space 24 is greater than the tangential velocity of said nozzles 12. Space 24 is provided to allow the working fluid to pass into said second rotor radially inward extending passageways. Normally, the tangential velocity of said fluid in space 24 is approximately same as the tangential velocity of said second rotor outer periphery, thus allowing entry of said working fluid to said second rotor passages without shock. If said second rotor speed is different than the speed of said working fluid, the second rotor passageways may be shaped for the fluid entry, as is a standard practice with turbine fluid passages. It should be noted also that the tangential velocity of said second rotor is normally greater than the tangential velocity of said first rotor at periphery. In an operating turbine, the first rotor requires work input, and the second rotor produces work; part of the work generated by said second rotor may be passed to said first rotor through a suitable power transmission device. Normally, the rotational speed differential for the two rotors is fixed; however, a variable speed differential may be provided for control purposes.

The nozzles 12 are sized and shaped for the fluid, and may be either converging or converging-diverging in shape. For most applications, converging nozzles are sufficient, since the velocity of the fluid passing through is below sonic speed.

What is claimed is:

1. A turbine for generating power from a centrifugally compressed fluid comprising:

enclosure means;

a primary rotor means rotatably mounted in said enclosure means for subjecting the fluid therein to a centrifugal force field; said primary rotor means having a first passageway formed therein for providing a means for introducing the fluid to be compressed; said primary rotor means having internal vanes defining radially extending passageways communicating with said first passageway for ensuring that the fluid in said radially extending passageways rotates with the velocity of said primary rotor means; a nozzle formed at the end of each radially extending passageway being forwardly oriented to discharge the compressed fluid in the radially extending passageways in the direction of rotation for accelerating the fluid to a tangential velocity that is greater than the tangential velocity of said primary rotor means; said discharge nozzles being shaped to obtain the highest obtainable exit velocity for the fluid for the available energy differential available between entry and exit ends of said nozzle;

a first shaft axially formed in said primary rotor means for inputting the necessary power to affect rotation thereof; said shaft extending partially through said primary rotor means with one end of said shaft adjacent an enlarged cavity portion formed axially within said primary rotor means and an opposite end of said shaft extending outwardly from a first side of said enclosure means;

a secondary rotor means positioned within said enlarged cavity and rotatably mounted coaxially with said primary rotor means and said first shaft for absorbing the work associated with the deceleration of the fluid exiting from said discharge nozzles of said primary rotor means; and secondary rotor means having an egress passageway formed therein for providing a means for egress of the fluid compressed in said primary rotor means, said secondary rotor means having internal vanes defining radially inwardly extending passageways communicating with said egress passageway for ensuring that the fluid there in rotates with the velocity of said secondary rotor means;

a second shaft axially formed in said secondary rotor means for outputting power effected by the rotation thereof, said shaft extending substantially through said secondary rotor means with an end of said second shaft extending outwardly from a second opposite side of said enclosure means.

2. The turbine of claim 1 wherein a heating heat exchanger is placed within said radially outward extending passageways of said first rotor for adding heat to said working fluid during compression; with a heating fluid being circulated through said heat exchanger with said heating fluid being in heat exchange relationship with said working fluid, and with said heating fluid being supplied to said heat exchanger via passages through the said first rotor shaft and being returned via said first rotor shaft.

3. The turbine of claim 1 wherein said casing is provided with an aperture for evacuating a space between said rotors and said casing for reducing fluid friction on said rotors.

4. A turbine for generating power from a centrifugally compressed fluid, comprising:

a. a casing enclosing rotors therewithin and for supporting shafts for said rotors;

b. shafts journalled in bearings in said casing for rotation;

c. a rotating first rotor mounted on a shaft so as to rotate in unison therewith, said first rotor being of circular configuration and adapted for high speed rotation, and having an entry port for a working fluid near the center of said first rotor and having radially extending passageways for said working fluid with vanes therewithin for ensuring that said working fluid therewithin rotates at the rotational speed of said first rotor for effecting centrifugal compression of said working fluid and effecting acceleration of said fluid to the rotational speed of said rotor; said radially extending passageways being provided with suitable discharge passageways at their outward ends for allowing egress of said working fluid;

d. a second rotor mounted on a shaft so as to rotate in unison therewith, said second rotor being of circular configuration and adapted for high speed rotation; and having entry for said working fluid at the periphery of said second rotor with radially inward extending passageways having vanes therewithin to ensure that said working fluid therewithin rotates at the rotational speed of the said rotor for receiving by said rotor the work associated with deceleration of said working fluid, and an exit port for said working fluid near the center of said second rotor;

e. a heat exchanger formed within said radially outward extending passageways of said first rotor for adding heat to said working fluid during compression; with a heating fluid being circulated through said heat exchanger with said heating fluid being in heat exchange relationship with said working fluid, and with said heating fluid being supplied to said heat exchanger via passages near the said first rotor center and being returned via passages near said first rotor center.

5. The turbine of claim 4 wherein a heat exchanger is placed within said radially inward extending passageways of said second rotor and having a heating fluid circulated therewithin with said heating fluid being supplied via passages near said second rotor center and returned via passages near said second rotor center, with said heating fluid being in heat exchange relationship with said working fluid during expansion.

6. The turbine of claim 5 wherein both the working fluid and the heating fluids are gases, with the heating fluid being at a relatively higher temperature than the working fluid.

7. A method of generating power from a centrifugally compressed fluid in a turbine comprising the steps of:

subjecting the fluid to a centrifugal force field through a primary rotor having radially extending passageways for containing the fluid and ensuring that the fluid attains the same rotational speed as said rotor to accelerate said fluid with accompanying temperature and pressure increase;

passing the working fluid in its compressed state through discharge passageways in the form of nozzles having forwardly extending orientations, for imparting a tangential velocity thereto greater than the tangential velocity of the primary rotor nozzles;

receiving the working fluid from the nozzles into radially inward extending passageways formed in a secondary rotor;

decelerating the working fluid in said radially, inwardly extending passageways for imparting rotational energy to said secondary rotor; and egressing the fluid from the secondary rotor.

8. The method of generating power as defined in claim 7 and further including imparting heat to the working fluid being centrifugally compressed in said primary rotor.

* * * * *